(12) United States Patent
Sergyeyenko

(10) Patent No.: US 7,564,020 B2
(45) Date of Patent: Jul. 21, 2009

(54) SYSTEM AND METHOD FOR LASER DETECTOR WITH MARKER

(75) Inventor: Margarita Sergyeyenko, Brockville (CA)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/595,139

(22) Filed: Nov. 9, 2006

(65) Prior Publication Data

US 2007/0107241 A1   May 17, 2007

Related U.S. Application Data

(60) Provisional application No. 60/735,133, filed on Nov. 9, 2005.

(51) Int. Cl.
*G01J 1/42* (2006.01)
*B41J 3/36* (2006.01)

(52) U.S. Cl. ............... 250/208.4; 250/208.2; 347/225; 347/109; 101/485; 33/34; 33/35

(58) Field of Classification Search ............ 250/208.2, 250/208.4, 559.44, 559.26, 559.29, 203.1, 250/203.2, 221, 206.1; 347/225, 19, 109; 101/485, 486; 356/622; 209/588, 3.3; 33/34, 33/35

See application file for complete search history.

(56) References Cited

U.S. PATENT DOCUMENTS

| | | | |
|---|---|---|---|
| 2,312,626 A * | 3/1943 | Chamberlin et al. | 101/234 |
| 3,445,672 A * | 5/1969 | Marks | 250/559.49 |
| 3,759,620 A * | 9/1973 | Cushing et al. | 356/430 |
| 4,412,232 A | 10/1983 | Weber et al. | |
| 4,583,126 A * | 4/1986 | Stoffel | 358/401 |
| 4,746,936 A | 5/1988 | Takahashi | |
| 4,757,197 A | 7/1988 | Lee | |
| 4,865,872 A * | 9/1989 | Pellatiro | 427/9 |
| 5,053,789 A * | 10/1991 | Fujii et al. | 347/225 |
| 5,486,690 A | 1/1996 | Ake | |
| 6,209,832 B1 | 4/2001 | Yamazaki | |
| 6,295,737 B2 * | 10/2001 | Patton et al. | 33/18.1 |
| 6,578,276 B2 * | 6/2003 | Patton et al. | 33/18.1 |
| 6,606,798 B2 | 8/2003 | McCracken et al. | |
| 6,784,415 B2 * | 8/2004 | Kudo et al. | 250/221 |
| 6,952,880 B2 * | 10/2005 | Saksa | 33/35 |
| 2003/0146373 A1 * | 8/2003 | Kudo et al. | 250/221 |
| 2008/0296391 A1 * | 12/2008 | May et al. | 235/472.01 |

OTHER PUBLICATIONS http://computer.howstuffworks.com/inkjet-printer.htm/printable, pp. 1-12.

* cited by examiner

*Primary Examiner*—Stephen Yam
(74) *Attorney, Agent, or Firm*—Harness, Dickey & Pierce, P.L.C.

(57) ABSTRACT

A light detector system for use with a work-piece is provided. The light detector system can include a housing and at least one sensor coupled to the housing. The sensor can be responsive to a light source to generate a signal that indicates a location of the light source with respect to the housing. The light detector system can also comprise a marker coupled to the housing. The marker can be responsive to the signal to mark the location of the light source on a surface of the work-piece.

18 Claims, 9 Drawing Sheets

SYSTEM AND METHOD FOR LASER DETECTOR WITH MARKER

CROSS-REFERENCE TO RELATED APPLICATIONS

The present application claims the benefit of U.S. Provisional Application No. 60/735,133, filed on Nov. 9, 2005.

INTRODUCTION

The present invention relates generally to a light detection device, and more particularly to a system and method for a light detector including a marker for marking the location of the detected light on a work-piece.

Traditionally, lasers have been employed in the construction industry to assist in the preparation of surfaces for cutting operations and in the alignment of objects. For example, a laser emitting device can be used to generate a horizontal or vertical line that can comprise a cutting path for machining a work-piece to assist the user in producing an accurate cut. Further, lasers can be used with levels to project a horizontal or vertical line to enable a user to ensure that multiple objects are properly aligned.

Typically, however, laser emitting devices only provide a projected image, which can be obscured if the light source is obstructed. In addition, the laser projected by the laser emitting devices can be difficult for the user to read in certain lighting conditions. Accordingly, it would be desirable to provide a device, such as a light detector, that is capable of identifying the laser projected by the laser emitting device and that further includes a marking system that can indicate the exact position of the laser on the work-piece in a manner that is easily viewable by a user.

In one implementation, a light detector system for use with a work-piece is provided. The light detector system can include a housing and at least one sensor coupled to the housing. The sensor can be responsive to a light source to generate a signal that indicates a location of the light source with respect to the housing. The light detector system can also comprise a marker coupled to the housing. The marker can be responsive to the signal to mark the location of the light source on a surface of the work-piece.

Also provided is a tool for use with a light source on a work-piece. The tool can include a housing and at least one sensor coupled to the housing. The sensor can be responsive to the light source to generate a first signal that indicates a detection of the light source with respect to the housing. The tool can also comprise a controller that generates a second signal based on the first signal and a marker coupled to the housing and responsive to the controller to mark the work-piece based on the second signal to indicate the location of the light source on the work-piece. The second signal can be indicative of a location for the marker with respect to the housing that corresponds to the location of the light source on the work-piece.

A method of marking a light path is also provided. The method can include providing a marker adjacent to a surface of a work-piece and determining a location of a light source with respect to the marker. The method can also comprise marking the surface of the work-piece to indicate the location of the light source on the work-piece such that the mark remains on the work-piece after the light source is removed.

Further areas of applicability of the present teachings will become apparent from the detailed description provided hereinafter. It should be understood that the detailed description and specific examples, while indicating various embodiments of the present teachings, are intended for purposes of illustration only and are not intended to limit the scope of the present teachings.

BRIEF DESCRIPTION OF THE DRAWINGS

The present invention will become more fully understood from the detailed description and the accompanying drawings, wherein.

DETAILED DESCRIPTION OF THE VARIOUS EMBODIMENTS

The following description of various embodiments is merely exemplary in nature and is in no way intended to limit the present teachings. Although the following description is related generally to a light detector including a marker to mark the position of a projected laser beam onto a work surface or work-piece, it will be understood that the light detector and/or the marker, as described and claimed herein, can be used in combination with any appropriate tool, such as a level or stud finder. Therefore, it will be understood that the following discussions are not intended to limit the scope of the appended claims.

Figure 1:
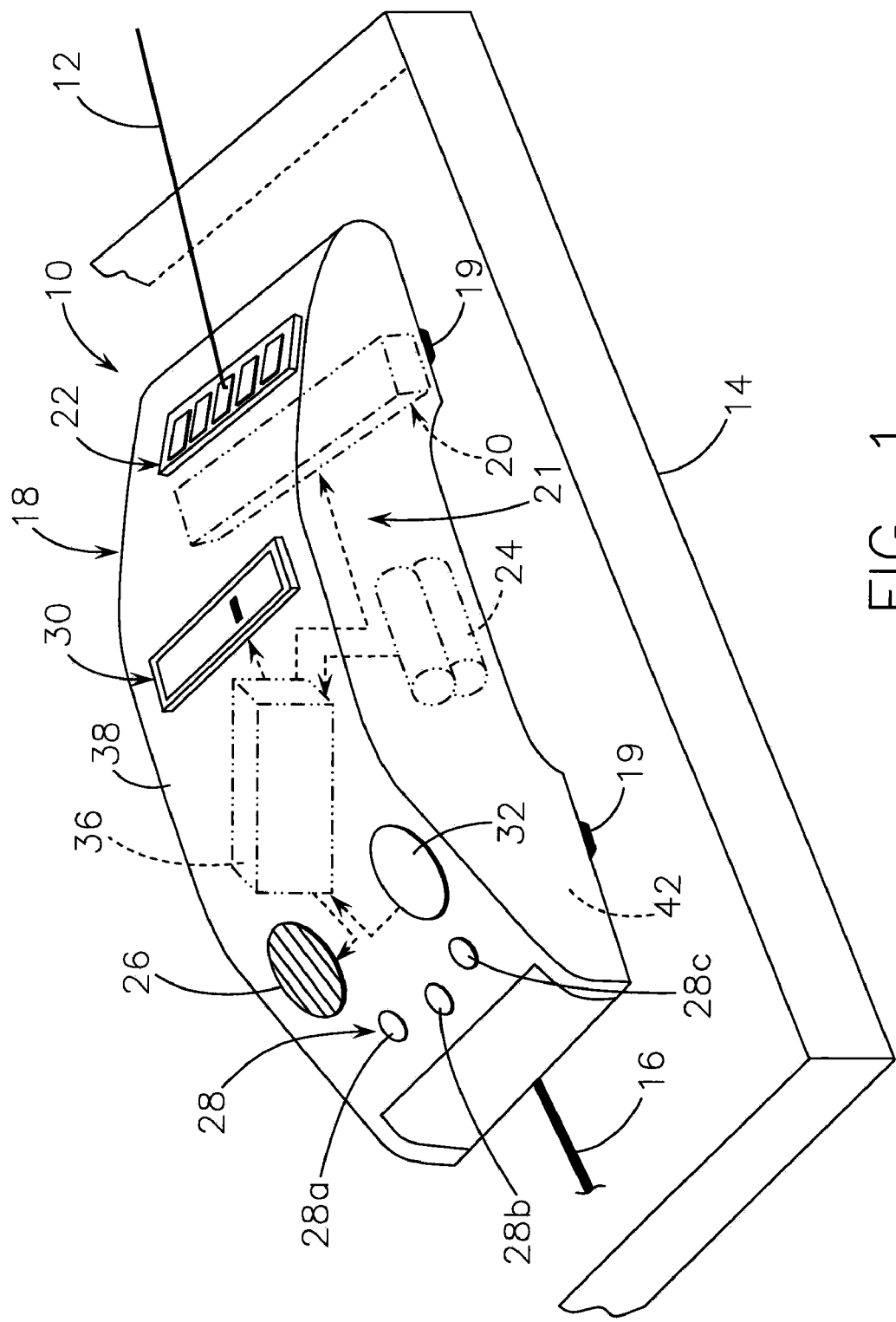
FIG. 1 is a perspective view of an exemplary laser detector with a marker shown in phantom on a work-piece in a first location according to various teachings.

With reference to FIG. 1, an exemplary light detector system or light detector 10 is shown. The light detector 10 can be used to detect a location of a projected planar light source, such as a laser beam 12, and can enable an operator to indicate or mark the location of the projected laser beam 12 on a surface of a work-piece or work-piece 14 via a marking 16. It should be noted that although the light source will be discussed herein with reference to the laser beam 12, any light source could be employed with the light detector 10, including light sources that are not in the visible light range. An exemplary light source that generates a laser beam is disclosed in U.S. Pat. No. 6,606,798, entitled "Laser Level", filed on Feb. 1, 2002 and incorporated by reference herein in its entirety. Another exemplary light source that generates a laser beam is disclosed in U.S. Pat. No. 7,059,057, entitled "Laser Level", filed on Oct. 20, 2003 and incorporated by reference herein in its entirety. The marking 16 generated by the light detector 10 can enable a user to view the location of the laser beam 12, which was projected onto the work-piece 14 after the laser beam 12 has been removed.

Figure 2:
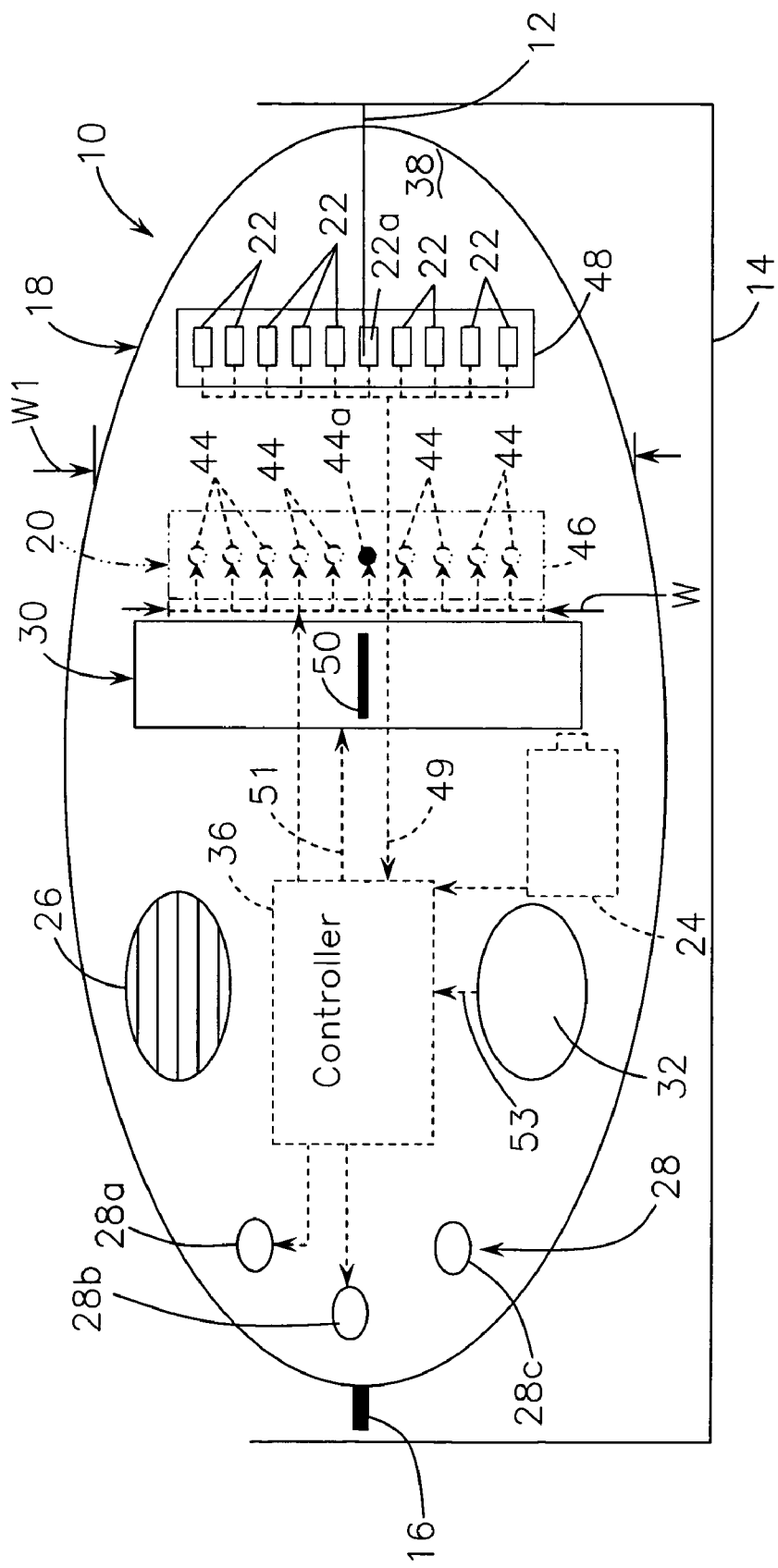
FIG. 2 is a top view of the laser detector of FIG. 1.
Figure 3:
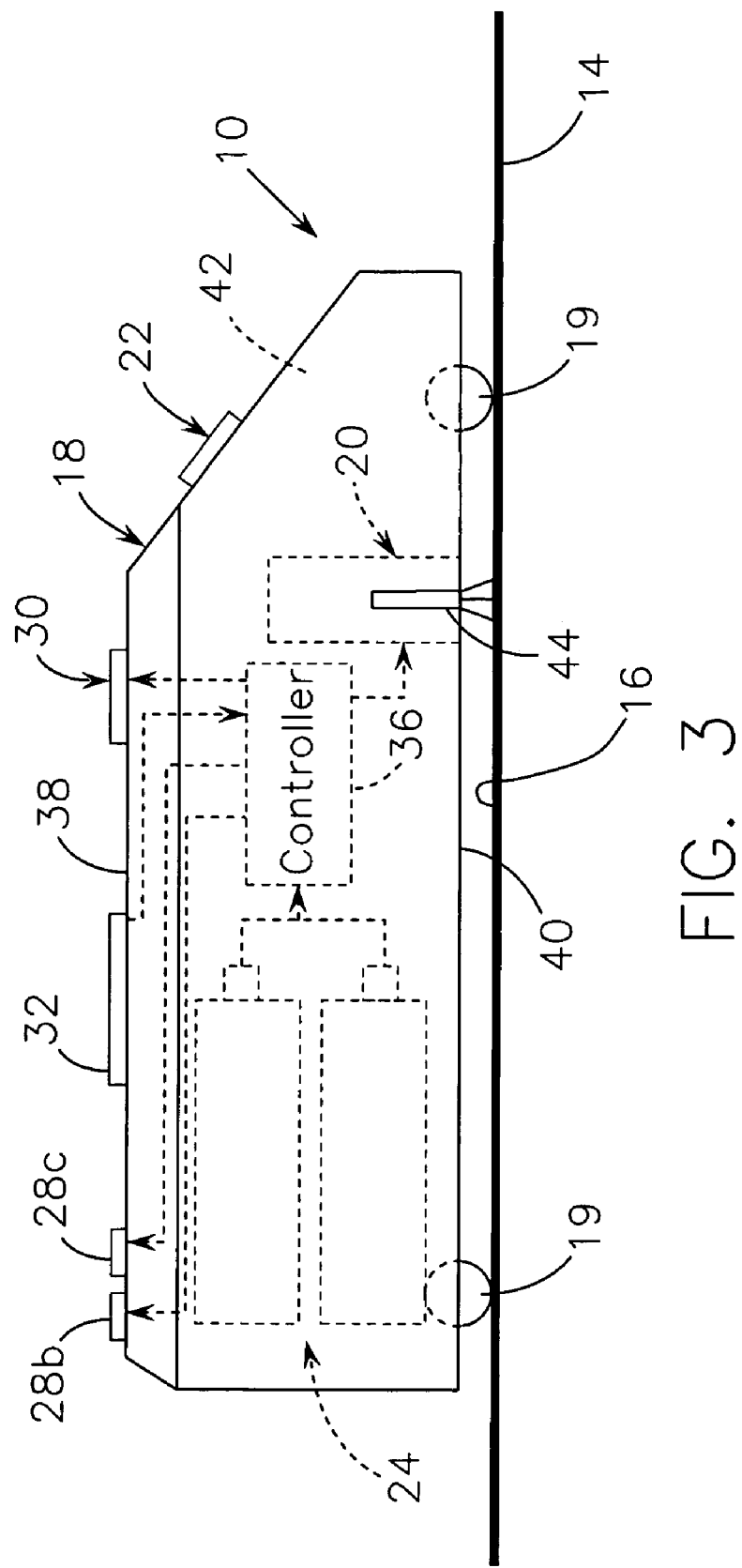
FIG. 3 is a side view of the laser detector with the marker shown in phantom on the work-piece of FIG. 1.

With continuing reference to FIG. 1 and with additional reference to FIGS. 2 and 3, the light detector 10 can include a housing 18 with one or more wheels 19 that can house a marker 20. The light detector 10 can also include one or more sensors 22, a power source 24, a speaker 26, at least one or more visual indicators 28, a display 30 and a user input device 32, each of which can be coupled to the housing 18. The light detector 10 can also include a controller 36 housed in the housing 18.

As best shown in FIG. 3, the housing 18 can include a first surface 38 and a second surface 40 that can be spaced apart to define a cavity 42. The housing 18 can be composed of a polymeric material, and can be molded into any desired shape. Generally, however, the housing 18 can be molded into a shape such as that which enables a user to easily grasp the housing using a graspable portion 21 and manipulate the light detector 10 (shown in FIG. 1). The wheels 19 can extend through the second surface 40 of the housing 18 and can include the wheels 19 that can permit the user to roll or slide the light detector 10 over the work-piece 14 to detect and mark the location of the laser beam 12, as will be discussed.

With reference to FIGS. 2 and 3, the marker 20 can be disposed within the housing 18 such that the marker 20 can be operated to mark the work-piece 14. The controller 36 can provide power to the marker 20 from the power source 24 to enable the marker 20 to generate the marking 16. The marker 20 can include one or more ink jet nozzles 44 that can be arranged in a linear array 46. A selected one of the ink jet nozzles 44a can be activated by the controller 36 to mark the work-piece 14, as will be discussed herein. Generally, the selected ink jet nozzle (e.g., ink jet nozzle 44a), when activated, can output the marking 16 as an ink jet mark onto the work-piece 14. Exemplary ink jet nozzles 44 that can be employed with the light detector 10 are disclosed in greater detail in U.S. Pat. No. 4,412,232 entitled "Ink Jet Printer" which is hereby incorporated by reference in its entirety.

Alternatively, the ink jet nozzles 44 could comprise a plurality of ink jet pens. The ink jet pens can be selectively activated by the controller 36 to emit ink onto the work-piece 14. An exemplary ink jet pen is described in U.S. Pat. No. 4,746,936 entitled "Ink Jet Pen", which is hereby incorporated by reference in its entirety. Further, it will be understood that although the use of an ink jet based marker 20 is described herein, any suitable marker could be employed such as a pen, ink marker, scratching tool, etching tool or combinations thereof. The linear array 46 of the marker 20 can align the ink jet nozzles 44 along a width W that is less than a width W1 of the housing 18. The linear array 46 can further serve to correlate each one of the ink jet nozzles 44 with one of the sensors 22.

The sensors 22 can be coupled to the first surface 38 of the housing 18 in a linear array 48 that is sized to correspond to the linear array 46 of the ink jet nozzles 44. The sensors 22 can be arranged in the linear array 48 such that each one of the sensors 22 corresponds to one of the ink jet nozzles 44. The sensors 22 can comprise a plurality of photo detectors that are each responsive to the laser beam 12 to generate a laser detection signal 49. The laser detection signal 49 can comprise an indication that a particular sensor (e.g., sensor 22a) has detected the laser beam 12. Based on the laser detection signal 49, the controller 36 can activate the selected ink jet nozzle (e.g., ink jet nozzle 44a) that corresponds to the particular sensor (e.g., sensor 22a) that detected the laser beam 12, as will be discussed herein. Exemplary sensors 22 for use with the light detector 10 are disclosed in greater detail in U.S. Pat. No. 5,486,690 entitled "Method and Apparatus For Detecting Laser Light", hereby incorporated by reference in its entirety.

The power source 24 of the light detector 10 can be housed within the cavity 42 of the housing 18. The power source 24 can output a desired voltage to the controller 36. Generally, the power source 24 can comprise one or more batteries, however, the power could be provided to the controller 36 through a power cord and associated circuitry (not shown). The controller 36 can provide power to the marker 20 from the power source 24 upon the receipt of the laser detection signal 49, as will be discussed herein. The controller 36 can also provide power to activate the speaker 26, the visual indicators 28, and the display 30.

The speaker 26 can be disposed in the housing 18 and can broadcast audible messages or tones through an opening formed in the first surface 38 of the housing 18. As the speaker 26 can be a conventional speaker, the speaker 26 will not be described in great detail herein. Briefly, however, the speaker 26 can provide an audible indicator of a status of the light detector 10. For example, based on the laser detection signal 49, the controller 36 can generate an audible message or tone for broadcasting through the speaker 26 that is indicative of whether any of the sensors 22 have detected or have not detected the laser beam 12. In addition, the controller 36 can generate an audible message or tone for broadcasting by the speaker 26 indicative of a status of the power source 24, such as a low voltage condition.

The visual indicators 28 can be disposed in the first surface 38 of the housing 18, and can be responsive to the voltage received from the controller 36 to output visible light. The visual indicators 28 can comprise any visual light emitting device, such as a light emitting diode (LED). The visual indicators 28 can include a first visual indicator 28a, a second visual indicator 28b and a third visual indicator 28c. It should be noted that the reference numeral 28 will be used herein to denote all of the visual indicators 28a, 28b, 28c. The visual indicators 28 can output the visual light to indicate a particular condition. The first visual indicator 28a can indicate to the user whether the laser beam 12 is detected by any of the sensors 22. For example, the first visual indicator 28a can output a particular color of visual light, such as red, to indicate that the laser beam 12 is not detected by one of the sensors 22, and can output a different color of visual light, such as green, to indicate that the laser beam 12 is detected by one of the sensors 22. Alternatively, the first visual indicator 28a could output visual light only if the laser beam 12 is detected by one of the sensors 22.

The second visual indicator 28b can indicate to the user the status of the power source 24. For example, the second visual indicator 28b can output a particular color of visual light, such as red, to indicate that the power source 24 has a low voltage remaining, and can output a different color of visual light, such as green, to indicate that the power source 24 has sufficient voltage. Alternatively, the second visual indicator 28b could output visual light only if the power source 24 has a low voltage remaining. The third visual indicator 28c can indicate to the user the status of the speaker 26, such as an indication that a sound or the audible message or tone is capable of being broadcast by the speaker 26. The third visual indicator 28c can output a particular color of visual light, such as green, to indicate that the speaker 26 is on and operating and can output a different color of visual light, such as red, to indicate that the speaker 26 is off. Alternatively, the third visual indicator 28c could output visual light only if the speaker 26 is either on or off.

The controller 36 can provide power to a display 30. The display 30 can be coupled to the first surface 38 of the housing 18 and can include an indicator 50. The display 30 can be a liquid crystal display (LCD), but any suitable display could be employed. The indicator 50 can provide a visual indicator of the location of the laser beam 12 with respect to the housing 18. Thus, the display 30 can be responsive to the controller 36 for receipt of a signal 51 comprising a location of the laser beam 12. The location of the indicator 50 on the display 30 can correlate with the location of the laser beam 12 received in the signal 51 from the controller 36. If the laser beam 12 is outside the width W of the housing 18, then no indicator 50 need be displayed. Alternatively, an error message could be displayed on the display 30 if the laser beam 12 is outside the width W of the housing 18.

The user input device 32 can be coupled to the first surface 38 of the housing 18. Generally, the user input device 32 can extend from the first surface 38 of the housing 18 to enable the user to depress the user input device 32 to generate a user input signal 53. It should be noted, however, that although the user input device 32 is illustrated as a push button, the user input device 32 could comprise any suitable device capable of generating the user input signal 53 in response to a user input, such as a dial or toggle switch for example. The user input signal 53 can comprise a request to print or mark the work-piece 14. The user input device 32 can be in communication with the controller 36 to transmit the user input signal 53 to the controller 36.

The controller 36 can be housed in the housing 18 and can be in communication with the marker 20, sensors 22, power source 24, speaker 26, visual indicators 28 and display 30. The controller 36 is also responsive to the user input device 32 for receipt of the user input signal 53.

Figure 4:
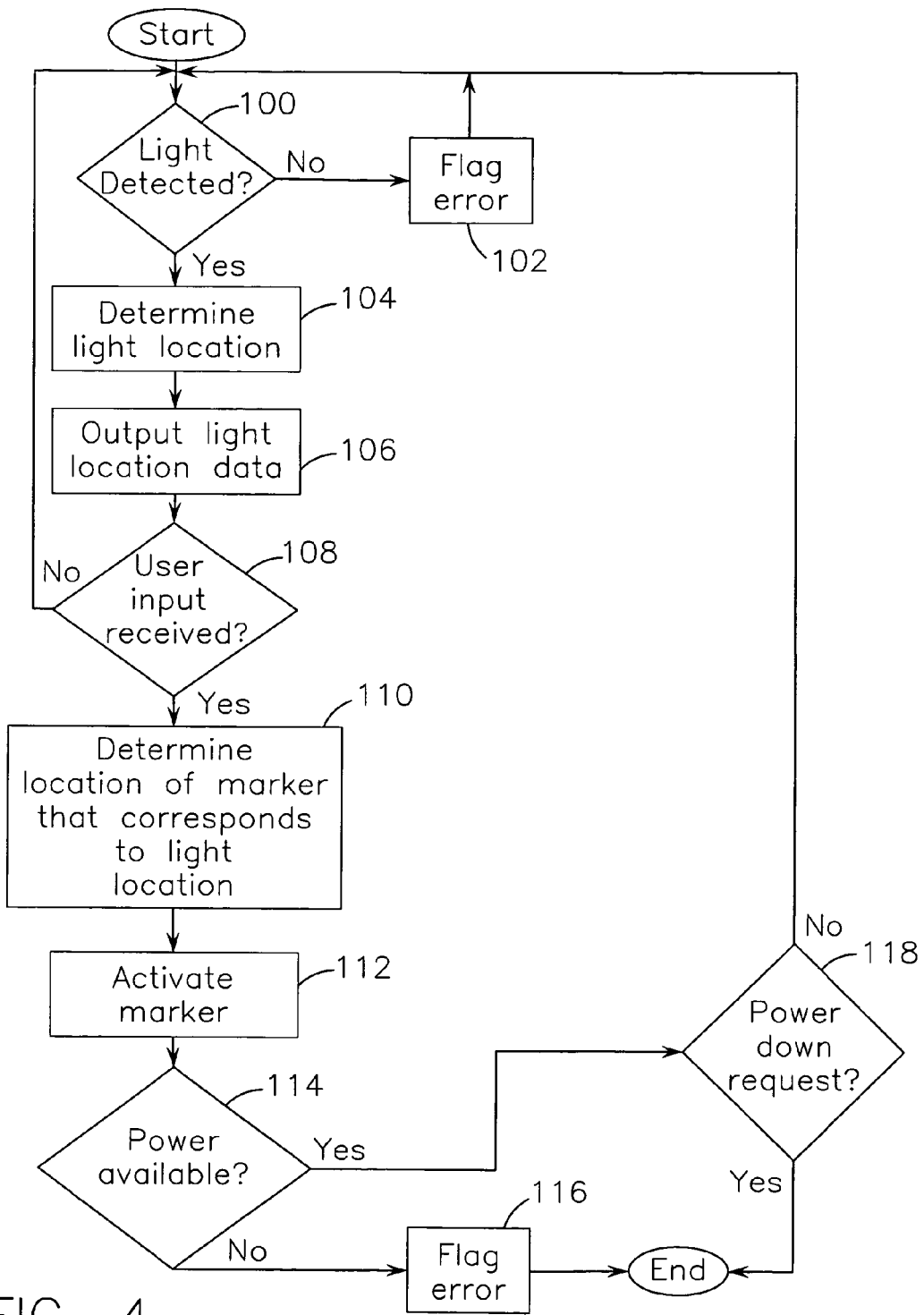
FIG. 4 is a flowchart illustrating a control method for the laser detector with marker according to various teachings.

In FIG. 4, an exemplary control method performed by the controller 36 (FIG. 2) is illustrated. With additional reference to FIG. 2, the exemplary control method will be discussed in detail. At decision block 100, control can determine if the laser beam 12 is detected. If the laser beam 12 is not detected, then at block 102, control can output an error. The error can be output as a signal to the speaker 26 to broadcast a message or tone, and/or can comprise a visual light output by the first visual indicator 28*a*. After the error is flagged at block 102, the method can loop to decision block 100.

If, at decision block 100, the laser beam 12 is detected, by receipt of the laser detection signal 49, then at block 104, control can determine the location of the laser beam 12 with respect to the housing 18. The location of the laser beam 12 can be determined based on which of the sensors 22 generated the laser detection signal 49, as the location of the sensors 22 with respect to the housing 18 is known. At block 106, based on the light detection signal 49, control can output to the display 30 the location of the laser beam 12 with respect to the housing 18, and can further output a signal and/or power to the speaker 26 and/or first visual indicator 28*a* that the laser beam 12 has been detected.

At decision block 108, control can determine if user input signal 53 has been received from the user input device 32. If user input signal 53 has not been received, then the method can loop to decision block 100. If user input signal 53 has been received, then at block 110, control can determine the location of the marker 20 that corresponds with the light detection signal 49. For example, control can determine which of the ink jet nozzles 44 of the marker 20 corresponds to the location of the laser beam 12 as determined by the sensor 22 that generated the light detection signal 49.

At block 112, control can activate the marker 20. The marker 20 can be activated upon receipt of a signal and power from the controller 36. The signal from the controller 36 can comprise which of the plurality of ink jet nozzles 44 to activate to mark the work-piece 14. When the selected ink jet nozzle 44*a* is activated, the ink jet nozzle 44*a* can print or mark the work-piece 14 with the marking 16.

At decision block 114, control can determine if the power source 24 has sufficient voltage. If the power source 24 does not have sufficient voltage, at block 116, an error is outputted. The error can comprise a signal and/or power transmitted to the speaker 26 and/or the second visual indicator 28*b* that the voltage of the power source is low. Then, the method can end.

Otherwise, if the power source 24 has sufficient voltage at decision block 114, then at decision block 118, control can determine if a power down request has been received. If a power down request has been received, then the method can end. Otherwise, the method can loop to decision block 100. By looping back to decision block 100, the control method can continuously monitor the location of the laser beam 12 with respect to the housing 18, and thus, can adjust the location of the marker 20 (i.e., select an ink jet nozzle 44) in real-time in case the user inadvertently moves the housing 18 off the laser beam 12, as best shown with respect to FIG. 5.

Figure 5:
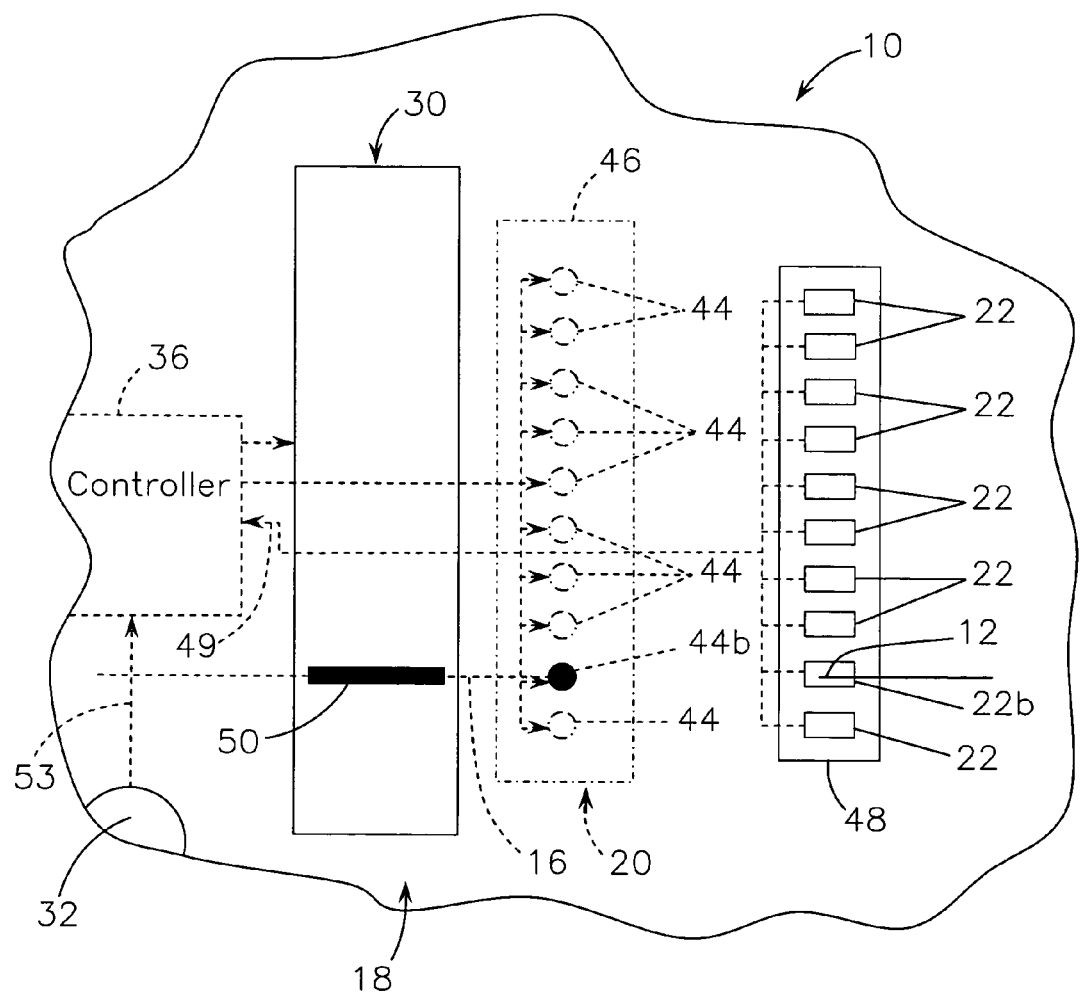
FIG. 5 is a detail view of the laser detector with the marker shown in phantom of FIG. 1 with the laser in a second location.
Figure 6:
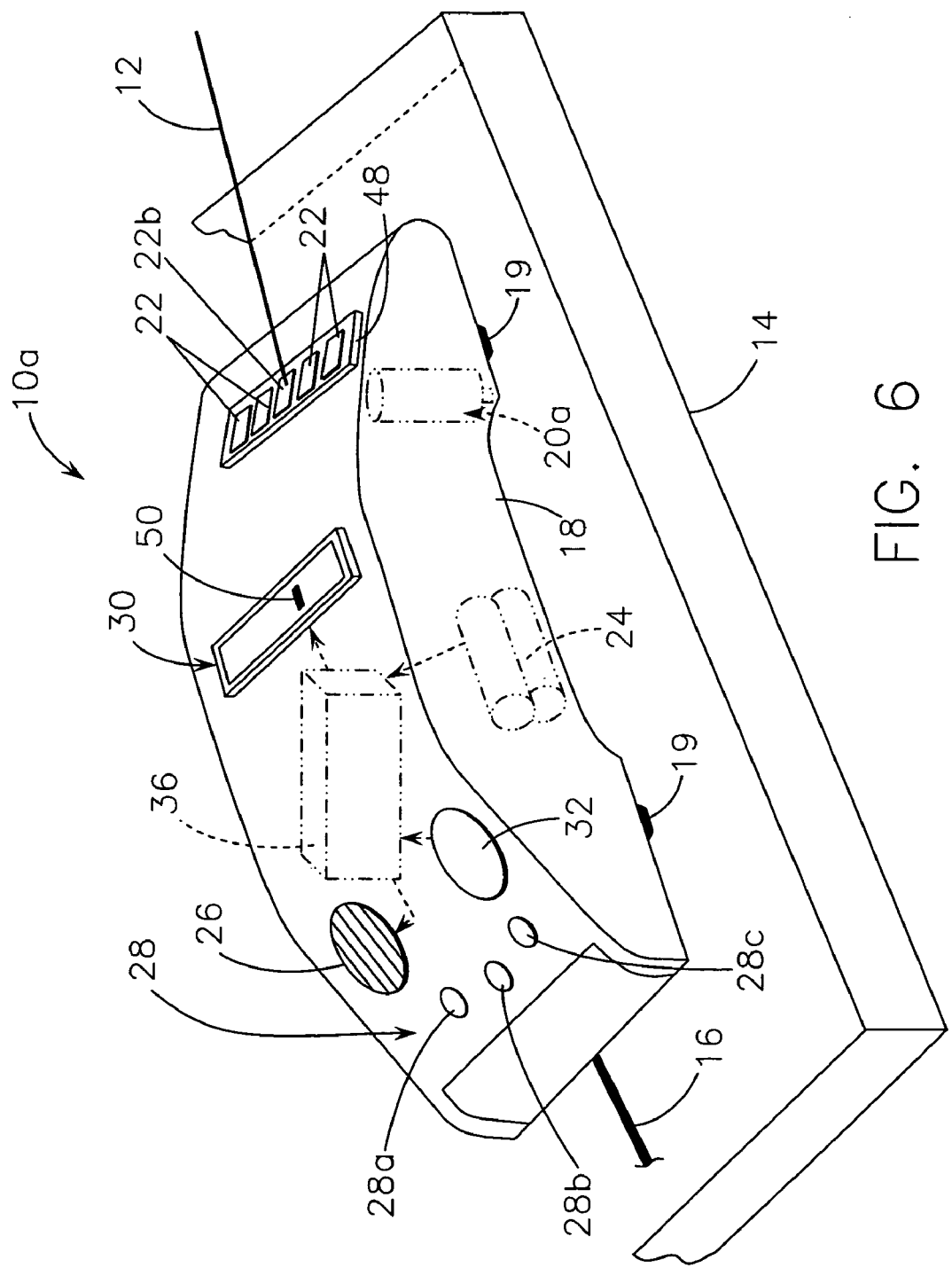
FIG. 6 is a perspective view of an alternative laser detector with a marker shown in phantom on a work-piece with the laser in a first location according to various teachings.

In FIG. 5, the light detector 10 has been moved with respect to the laser beam 12, and thus a different sensor 22*b* can provide the controller 36 with the light detection signal 49. Then, the controller 36 can output a new signal to the marker 20 upon receipt of the user input signal 53 to activate a different ink jet nozzle 44*b* that corresponds to the current real time location of the laser beam 12. In addition, the control method can also update the user of the changed location of the laser beam 12 in real-time through the speaker 26 (FIG. 2), the first visual indicator 28*a* (FIG. 2) and the display 30. Thus, the control system can enable the light detector 10 to continuously update the location of the laser beam 12 with respect to the housing 18, and can output this information and any change in location to the user.

With reference to FIGS. 6-9, another light detector 10*a* constructed in accordance with the teachings of the present disclosure is shown. The light detector 10*a* can include the housing 18, a marker 20*a*, the sensors 22, the power source 24, the speaker 26, the visual indicators 28, the display 30, the user input device 32 and the controller 36 for use with a light detector substantially similar to that described with regard to FIG. 1. As the housing 18, the sensors 22, the power source 24, the speaker 26, the visual indicators 28, the display 30 and the user input device 32 of the light detector 10*a* are substantially similar to the housing 18, sensors 22, power source 24, speaker 26, visual indicators 28, display 30 and user input device 32 discussed with regard to the light detector 10 of FIGS. 1-4, these features will not be discussed in detail herein with regard to the light detector 10*a*. Further, the same reference numerals will be used to denote the same or similar components.

Figure 7:
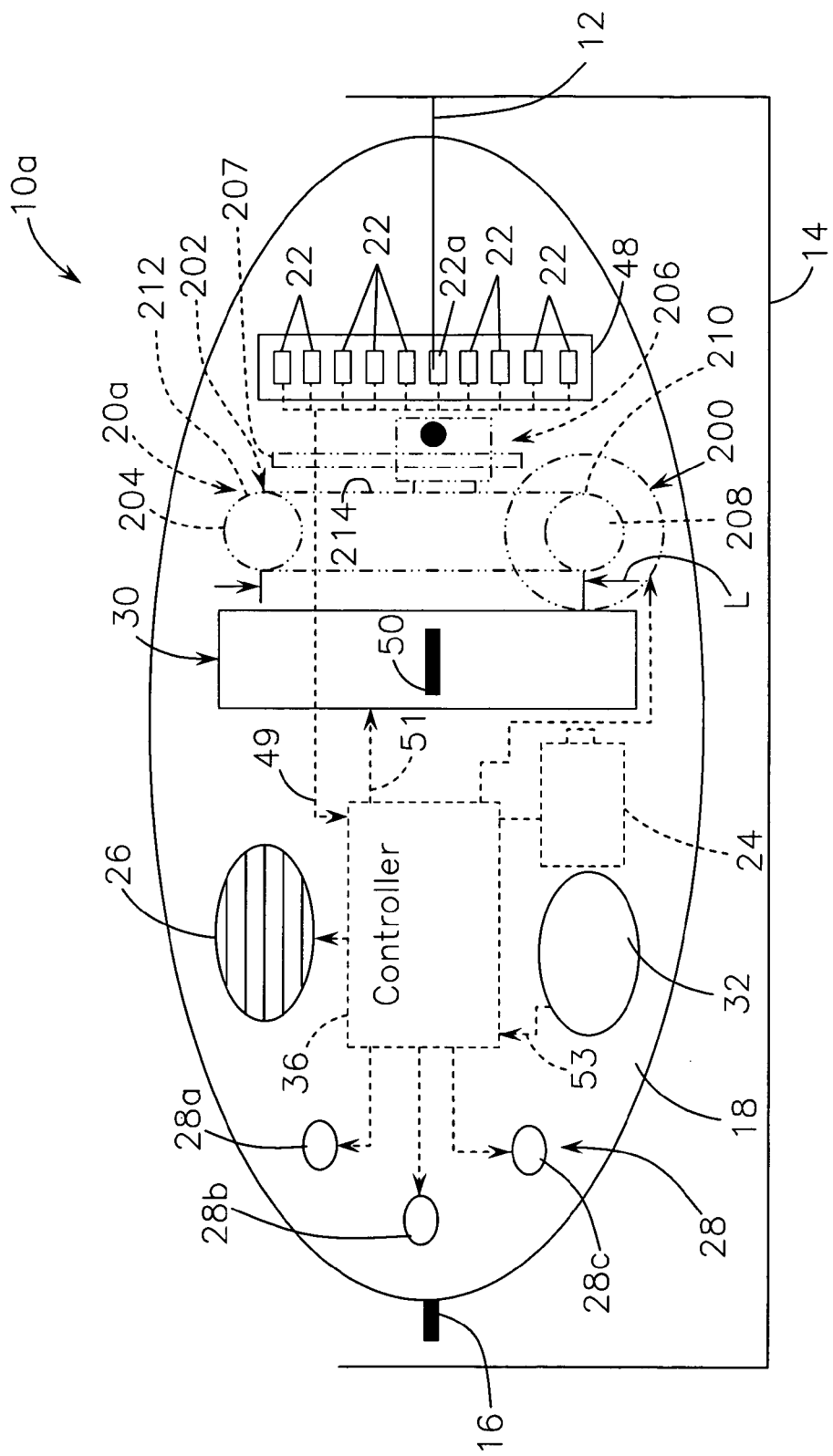
FIG. 7 is a top view of the laser detector of FIG. 6.

With reference to FIG. 7, the marker 20*a* of the light detector 10*a* can include a motor 200, a belt 202, a roller 204, and at least one printer head 206. The motor 200 can be activated by the controller 36, and can comprise a stepper motor for example. The motor 200 can include an output shaft 208. The output shaft 208 can be coupled to the belt 202. The belt 202 can have a first end 210 and a second end 212. The belt can also have a length L that is about equal to the width W of the linear array 48 of sensors 22. The first end 210 can be coupled to the output shaft 208 and the second end 212 can be coupled to the roller 204. The belt 202 can be driven about the roller 204 by the output shaft 208 when the motor 200 is activated. The motor 200 can be activated by the controller 36 for a specified period of time. Typically, the length of activation of the motor 200 is proportional to the number of revolutions of the output shaft 208 required to drive the belt 202, and thus, the printer head 206 into the proper position.

Figure 8:
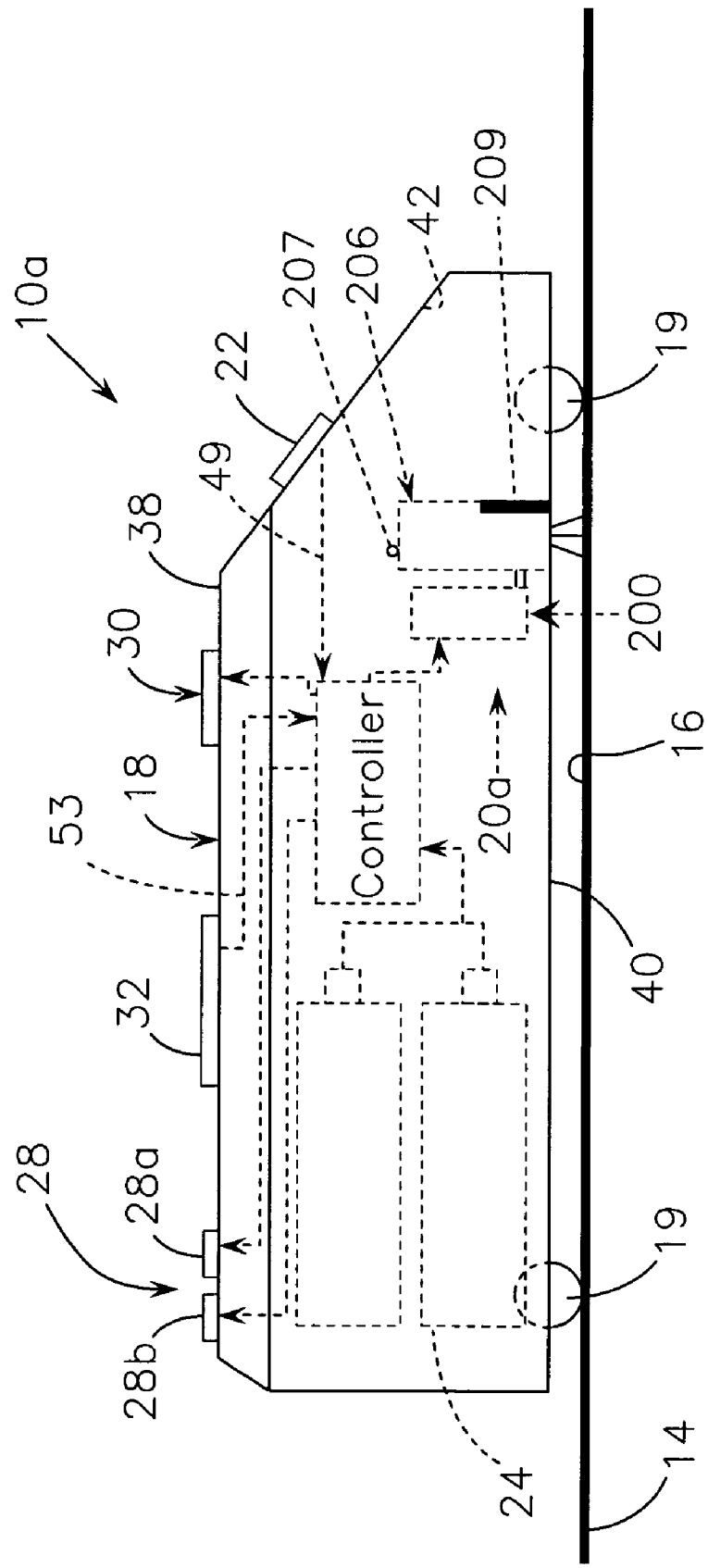
FIG. 8 is a side view of the laser detector with the marker shown in phantom on the work-piece of FIG. 6.

The printer head 206 can be coupled to a first side 214 of the belt 202 such that when the belt is driven by the motor 200, the printer head 206 is moved with respect to the housing 18. The printer head 206 can include a stabilizer bar 207 and ink jet cartridges 209 (FIG. 8). The stabilizer bar 207 can be used to control the precision of the movement of the printer head 206, and the ink jet cartridges 209 provide ink to the printer head 206 so that the printer head 206 can mark the work-piece 14 when activated. The printer head 206 can be activated by the controller 36 to output an ink jet mark or marking 16 onto the work-piece 14 that indicates the location of the laser beam 12, as will be discussed herein.

The controller 36 of the light detector 10a can perform substantially the same control method as discussed with regard to FIG. 4. In particular, with reference back to FIG. 4, control, upon receipt of the user input at decision block 108, can determine the location of the marker 20a detection that corresponds with the location of the laser beam 12 based on the light detection signal 49. Thus, control can determine the required length of activation of the motor 200 needed to drive the belt 202 to position the printer head 206 in the proper location with respect to the work-piece 14. Then, at decision block 112 (FIG. 4), control can activate the marker 20a to mark the work-piece 14. In order to activate the marker 20a, control can supply power to the motor 200 for a specified period of time equivalent to the revolutions of the output shaft 208 required to drive the belt 202, and thus, the printer head 206 into the proper position. Thus, when the motor 20a is activated, the output shaft 208 can drive the belt 202 to move the printer head 206 into the location that corresponds with the location of the laser beam 12. Then, the printer head 206 can generate the marking 16.

Then, if no power down request is received in decision block 118 (FIG. 4), the method loops to decision block 100 (FIG. 4). Thus, the control method employed with the light detector 10a can continuously monitor the location of the laser beam 12 with respect to the housing 18, and thus, can real-time adjust the location of the marker 20a in case the user inadvertently moves the housing 18 off the laser beam 12, as best shown with respect to FIG. 9.

Figure 9:
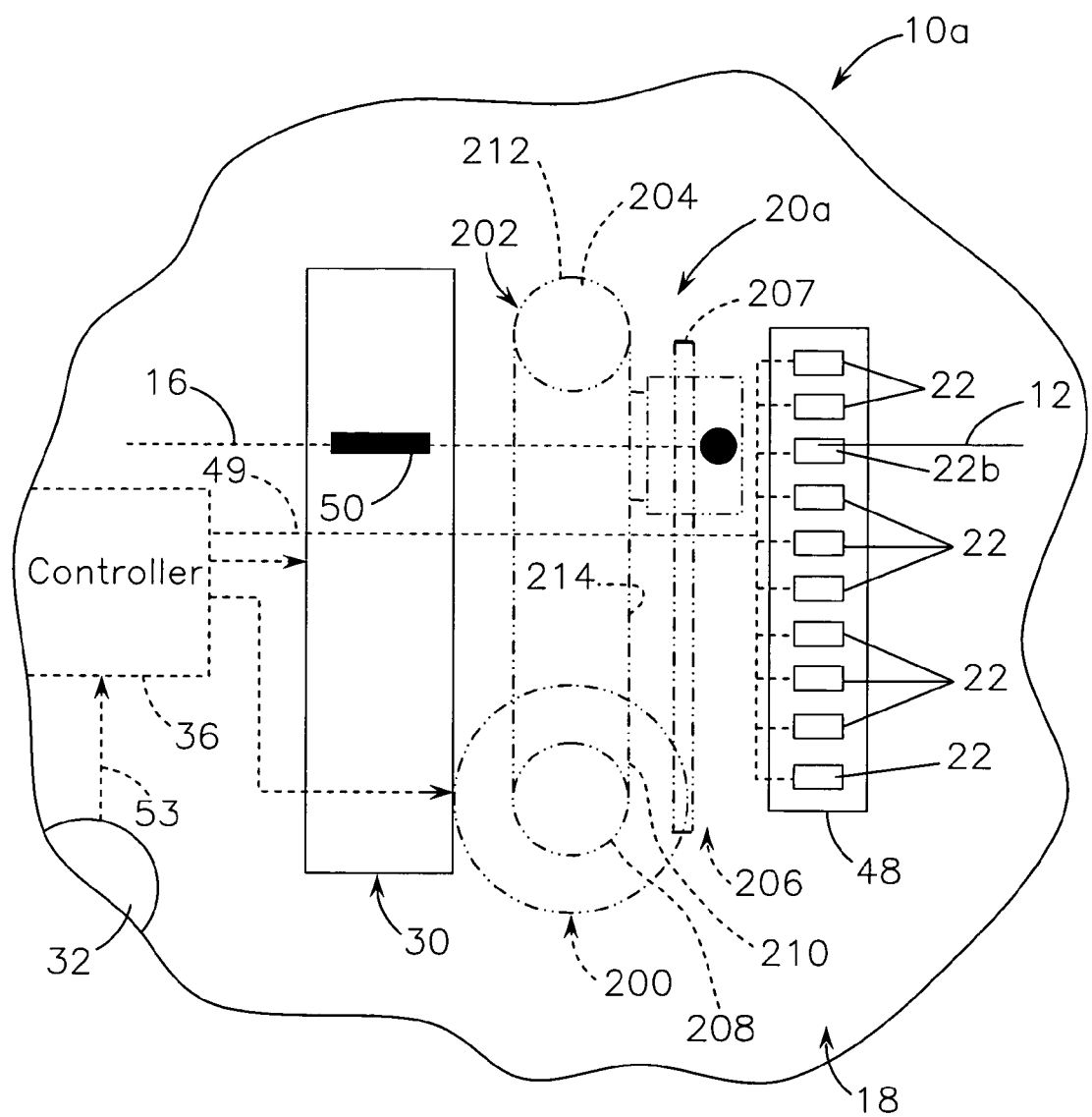
FIG. 9 is a detail view of the laser detector with the marker of FIG. 6 shown in phantom and the laser in a second location.

In FIG. 9, the light detector 10a has been moved with respect to the laser beam 12, and thus a different sensor 22b can provide the controller 36 (FIG. 7) with the light detection signal 49 (FIG. 7). Then, the controller 36 (FIG. 7) can output a new signal to the marker 20 upon receipt of the user input signal 53 (FIG. 7) to supply power to the motor 200 for a specified period of time equivalent to the revolutions of the output shaft 208 required to drive the belt 202, and thus, the printer head 206 into the proper position that corresponds to the current real time location of the laser beam 12. In addition, the control method can also update the user of the changed location of the laser beam 12 in real-time through the speaker 26 (FIG. 7), the first visual indicator 28a (FIG. 7) and the display 30. Thus, the control system can enable the light detector 10a to continuously update the location of the laser beam 12 with respect to the housing 18, and can output this information and any change in location to the user.

Thus, in order to operate the light detector 10, 10a, the user can provide a planar light source or laser beam 12 (not shown). Then, the user can position the housing 18 adjacent to the laser beam 12 (FIGS. 1, 5). If the sensors 22 can sense the laser beam 12, then the controller 36 can output the audible message or tone through the speaker 26 and/or a visual indication of the detection of the laser beam 12 with the first visual indicator 28a (FIGS. 2, 7). In addition, the indicator 50 on the display 30 can provide the user with the location of the laser beam 12 with respect to the housing 18. Otherwise, if the laser beam 12 is not detected by the sensors 22, then the controller 36 can output the audible message or tone through the speaker 26 and/or a visual indication of the inability to detect the laser beam 12 with the first visual indicator 28a.

Once the housing 18 is aligned with the laser beam 12, the user can depress the user input device 32 (not shown). If the user input device 32 is depressed, then the marking 16 can be placed onto the work-piece 14 in a location that corresponds to the location of the laser beam 12 (FIGS. 1, 5). Then, if desired, the user can move the light detector 10, 10a with respect to the work-piece 14 (not shown). If the user input device 32 is depressed while the user is moving the light detector 10, 10a, then the marking 16 can form a continuous, solid line (not shown). If, however, the user moves the light detector 10, 10a without depressing the user input device 32, then the marking 16 can be a broken, dashed line (not shown). Further, as the user moves the light detector 10, 10a, the location of the laser beam 12 is continuously updated such that the display 30 can always display the location of the laser beam 12 with respect to the housing 18 (FIGS. 5, 9), the speaker 26 and visual indicator 28 can provide additional audio and visual indicators of the location of the laser beam 12 and the marking 16 can track the location of the laser beam 12 (FIGS. 1, 5). Thus, if the user shifts the light detector 10, 10a with respect to the laser beam 12, the marking 16 will still remain at the location of the laser beam 12.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

For example, while the light detector has been described as including a user input device 32 for generating a user input signal 53 for activating a marker 20, those of skill in the art will appreciate that the present disclosure, in its broadest aspects, may be constructed somewhat differently. For example, a signal for activating the marker 20 may be generated when the light detector has been moved by a desired distance or if a predetermined amount of time has elapsed. The wheels 19, for example, can be employed to activate a switch to generate a signal for activating the marker 20 in a manner that can be similar to that of a mechanical odometer.

What is claimed is:

1. A light detector system for use with a work-piece comprising:
    a housing having a graspable portion that is adapted to permit a user to move the housing over a surface of the work-piece;
    at least one sensor coupled to the housing and responsive to a light source to generate a signal that indicates a location of the light source with respect to the housing; and
    a marker housed within the housing, the marker being moveable relative to and within the housing and responsive to the signal to mark the location of the light source on the surface of the work-piece.

2. The system of claim 1, further comprising:
a controller that generates a second signal based on the signal, the second signal indicative of a location for the marker to move with respect to the housing to produce a mark that corresponds to the actual location of the light source on the work-piece.

3. The system of claim 2, wherein the sensor comprises an array of photo detectors, the array of photo detectors having a width about equal to a width of the housing and each of the photo detectors responsive to the light source to create the signal.

4. The system of claim 1, further comprising:
at least one display coupled to the housing to indicate a position of the light source on the work-piece with respect to the housing; and
at least one of a speaker or a visual indicator coupled to the housing and responsive to the location of the light source with respect to the housing to output at least one signal that the housing is not aligned or is aligned with the light source.

5. The system of claim 1, further comprising:
at least one user input device that generates a user input signal to activate the marker to mark the work-piece; and
wherein the marker marks the work-piece upon receipt of the user input signal and the signal from the sensor.

6. The system of claim 2, further comprising:
at least one power source to power the controller;
at least one indicator of a status of the power source coupled to the housing; and
wherein the controller provides power to the marker.

7. A light detector system for use with a work-piece comprising:
a housing;
at least one sensor coupled to the housing and responsive to a light source to generate a signal that indicates a location of the light source with respect to the housing;
a marker coupled to the housing and responsive to the signal to mark the location of the light source on a surface of the work-piece, the marker further comprising:
a motor including an output shaft;
a belt driven by the output shaft at a first end, and mounted to a roller at a second end;
a printer head mounted to a first side of the belt to mark the work-piece; and
wherein the motor is activated by the controller upon receipt of the signal to drive the belt to a location that correlates to the location of the light source on the work-piece to enable the printer head to mark the work-piece.

8. The system of claim 7, wherein the belt has a length that is about equal to the width of the array of photo detectors.

9. A tool for use with a light source on a work-piece comprising:
a housing positionable on the work-piece and having a graspable portion that is adapted to permit a user to move the housing over the work-piece so that the housing is disposed over a planar light beam projected by the light source;
at least one sensor mounted on an exterior of the housing and responsive to the light source to generate a first signal that indicates a detection of the light beam with respect to the housing;
a controller that generates a second signal based on the first signal; and
a marker housed within the housing, the marker being responsive to the controller to mark the work-piece to indicate the location of the light beam on the work-piece upon receipt of the second signal, which indicates a location for the marker to mark the work-piece with respect to the housing so that the mark corresponds to the location of the light beam on the surface of the work-piece.

10. The tool of claim 9, wherein the sensor comprises an array of photo detectors, the array of photo detectors having a width about equal to a width of the housing and each of the photo detectors responsive to the light source to create the first signal.

11. The tool of claim 10, wherein the marker further comprises an array of ink jet nozzles that are each capable of marking the work-piece upon receipt of the second signal, the array of ink jet nozzles having a width about equal to the width of the array of photo detectors.

12. The tool of claim 11, wherein the second signal indicates a particular ink jet nozzle to activate to mark the work-piece.

13. The tool of claim 10, wherein the marker further comprises:
a motor disposed in the housing and including an output shaft;
a belt driven by the output shaft at a first end and having a second end rotatably coupled to the housing, the belt having a length that is about equal to the width of the array of photo detectors;
a printer head mounted to a first side of the belt to mark the work-piece;
a stabilizer bar to control the movement of the printer head; and
wherein the motor is activated by the controller upon receipt of the second signal to drive the belt to a location that corresponds to the location of the light source on the work-piece to enable the printer head to mark the location of the light source on the work-piece.

14. The tool of claim 9, further comprising:
at least one display coupled to the housing to indicate a position of the light beam with respect to the housing;
at least one of a speaker or a visual indicator coupled to the housing and responsive to the location of the light source with respect to the housing to output at least one signal that the housing is not aligned or is aligned with the light beam;
at least one power source to power the controller;
at least one indicator of a status of the power source coupled to the housing; and
wherein the controller provides power to the marker.

15. A method of marking a light path comprising:
projecting a planar light beam onto a surface of a work-piece;
providing a housing including a marker housed therein and a user input device;
grasping a graspable portion of the housing;
positioning the housing on the surface of the work-piece;
determining a location of a light beam with respect to the marker; and
marking the surface of the work-piece with the marker to indicate the location of the light beam on the work-piece upon receipt of a user input signal from the user input device to mark the surface of the work-piece such that the mark remains on the work-piece after the light beam is removed.

16. The method of claim 15, wherein determining the location of the light beam further comprises:
providing at least one photo detector;
coupling the photo detector to the housing;

positioning the housing near the light beam;

generating a signal if the photo detector detects the light beam;

generating a signal if the photo detector does not detect the light beam; and displaying the location of the light beam on a display if the photo detector detects the light beam.

17. The method of claim 16, wherein providing the marker further comprises:

providing a plurality of ink jet nozzles;

arranging the ink jet nozzles into an array within the housing, the array of ink jet nozzles having a width about equal to a width of the photo detector; and activating a selected one of the ink jet nozzles in the array that corresponds to the location of the light beam on the work-piece to mark the work-piece upon receipt of the signal that the photo detector has detected the light beam and a user input signal.

18. The method of claim 16, wherein providing the marker further comprises:

providing a motor including an output shaft that drives a belt, providing at least one printer head including a stabilizer bar;

coupling the printer head to the belt;

activating the motor upon receipt of the signal and at least one user input signal to drive the belt;

driving the belt to align the printer head with the detected location of the light source on the work-piece; and activating the printer head to mark the location of the light source on the work-piece.

\* \* \* \* \*